Figure 1:
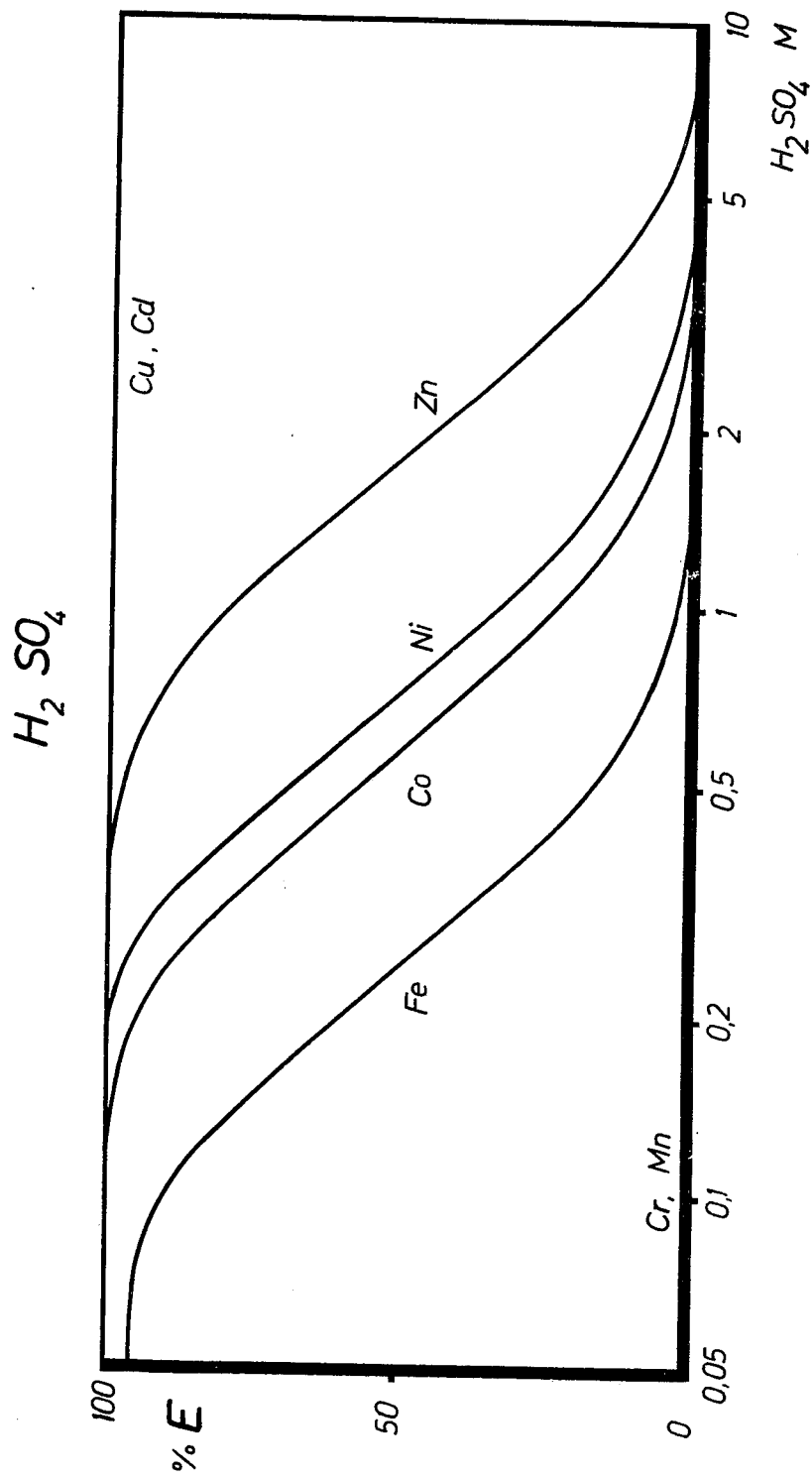

United States Patent [19]

Reinhardt et al.

[11] 4,226,791

[45] Oct. 7, 1980

[54] METHOD AND A REAGENT MIXTURE FOR REMOVING METAL IONS FROM AN AQUEOUS SOLUTION BY MEANS OF LIQUID-LIQUID EXTRACTION

[75] Inventors: Hans Reinhardt, V:a Frölunda; Harald D. Ottertun, Mölndal, both of Sweden

[73] Assignee: Berol Kemi AB, Stenungsund, Sweden

[21] Appl. No.: 964,959

[22] Filed: Nov. 30, 1978

Related U.S. Application Data

[63] Continuation of Ser. No. 786,848, Apr. 12, 1977, abandoned.

[51] Int. Cl.$^2$ .................... C07F 1/08; C07F 11/00; C07F 15/02; C07F 15/04
[52] U.S. Cl. .................... 260/429 R; 260/429.9; 260/438.1; 260/438.5 R; 260/439 R; 210/638; 75/101 BE; 423/24; 423/49; 423/54; 423/100; 423/139; 423/658.5
[58] Field of Search ........... 75/101 BE; 210/21, 38 B; 23/293 R; 252/179; 423/27, 34, 50, 109, 24, 54, 49, 100, 139, 698.5; 260/429.9, 438.1, 438.5 R, 439 R, 429 R

[56] References Cited

U.S. PATENT DOCUMENTS

| | | | |
|---|---|---|---|
| 2,859,094 | 11/1958 | Schmitt | 423/10 |
| 3,378,352 | 4/1968 | Hansen | 423/10 |
| 3,966,569 | 6/1976 | Reinhardt et al. | 423/24 |

OTHER PUBLICATIONS

Marcus and Kertes, Ion Exch. & Solv. Extrac. at Metal Complexes, 1969, 521–538, 548–551, 650–652, 836–846.

Primary Examiner—Hiram H. Bernstein
Attorney, Agent, or Firm—Birch, Stewart, Kolasch & Birch

[57] ABSTRACT

A liquid-liquid extraction process is disclosed, in which an aqueous solution, containing metal ions, is contacted with an organic liquid substantially insoluble in water. The organic liquid contains two water-insoluble reagents, viz. a diester of dithiophosphoric acid and an organic phosphate, in a preferred volume ratio of between 1:10 and 2:1. The organic liquid may also contain a diluent for the reagents.

11 Claims, 2 Drawing Figures

METHOD AND A REAGENT MIXTURE FOR REMOVING METAL IONS FROM AN AQUEOUS SOLUTION BY MEANS OF LIQUID-LIQUID EXTRACTION

This application is a continuation of copending application Ser. No. 786,848, filed on Apr. 12, 1977 and now abandoned.

The invention relates to a method and a reagent mixture for removing metal ions from an aqueous solution by means of liquid-liquid extraction.

It is known that an alkyldithiophosphoric acid is a useful reagent for extraction of nickel ions from an acid aqueous solution with the help of an organic solution. However, there are certain drawbacks with the known liquid-liquid extraction process. The washing (re-extraction) of the nickel ions out of the organic solution is a very slow process. Furthermore, an aqueous solution with a high acid content must be used to wash the nickel ions out of the organic solution.

According to the invention it has now been found that these drawbacks can be reduced if a diester of dithiophosphoric acid is used in combination with a phosphate as a reagent mixture for the liquid-liquid extraction. Furthermore, it has been found possible with extremely good results to extract, to re-extract and in many cases even to separate metal ions such as ions of iron, zinc, copper, nickel, cadmium, chromium and manganese, by using the new reagent mixture. The method according to the invention is characterized in that the aqueous solution containing metal ions is brought into contact with an organic liquid containing a water-insoluble diester of dithiophosphoric acid having the general formula

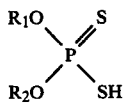

in which $R_1$ and $R_2$, independently of each other, represent a hydrophobic group, $R_1$ and $R_2$ being selected in such a way that the dithiophosphoric acid is insoluble in water, and a water-insoluble phosphate having the general formula

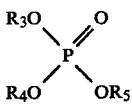

in which $R_3$ represents a hydrophobic group and $R_4$ and $R_5$, independently of each other, represent hydrogen or a hydrophobic group, $R_3$, $R_4$ and $R_5$ being selected in such a way that the phosphate is insoluble in water, in a ratio by volume between the dithiophosphoric acid and the phosphate of from 1:99 to 9:1, whereupon the metal ions pass to the organic liquid.

The invention also covers the reagent mixture defined above. The preferred volume ratio of dithiophoshoric acid to phosphate in said reagent mixture is between 1 to 9 and 2 to 1. The reagent mixture may also contain a diluent, such as kerosene.

To prevent the dithiophosphoric acid from being noticeably soluble in water, the hydrophobic groups preferably contains a hydrocarbon residue of at least 4 carbon atoms, preferably at least 6 carbon atoms. If there are more than 24 carbon atoms in the hydrocarbon residue, the extraction capacity will be reduced. The number of carbon atoms in said hydrocarbon residue should preferably not be greater than 16. Examples of such hydrophobic groups are a straight or branched, saturated or unsaturated aliphatic group, a cycloaliphatic group, a phenyl or a mono-, di- or trialkyl-substituted phenyl group, or a group having the formula $R_6O(A)_n$—$(CH_2CH(OH)CH_2)_m$, in which each A, independently of the others, represents an oxialkylene group derived from ethylene oxide, propylene oxide or butylene oxide, n is a number from 0-4, m is 0 or 1, the sum of m+n being at least 1, and $R_6$ represents a straight or branched, saturated or unsaturated aliphatic group, a phenyl or a mono-, di- or trialkyl-substituted phenyl group or a cyclo-aliphatic group. Illustrative examples of $R_1$, $R_2$ and $R_6$ as aliphatic groups are butyl, pentyl, hexyl, heptyl, octyl, isoctyl, 2-ethylhexyl, nonyl, isonyl, decyl, isodecyl, dodecyl, myristyl, palmityl, stearyl, oleyl, ricinoleyl, arachidyl and behenyl.

If $R_1$, $R_2$ and $R_6$ represent a cycloaliphatic group, then cyclohexyl, cyclohexylethyl, cyclohexylbutyl, ethylcyclohexyl, butylcyclohexyl, hexylcyclohexyl and octylcyclohexyl are especially recommended.

If $R_1$, $R_2$ and $R_6$ represent an aromatic group, useful examples are phenyl, methylphenyl, dimethylphenyl, propylphenyl, dipropylphenyl, butylphenyl, dibutylphenyl, octylphenyl, dioctylphenyl, nonylphenyl, dinonylphenyl and dodecylphenyl.

Illustrative examples of group A are oxyethylene, 1-oxypropylene, 2-oxypropylene, 2-oxy-2, 3-butylene and 1-oxy-1, 2-butylene.

In order to give the phosphate a low solubility in water, the hydrophobic group preferably contains a hydrocarbon residue of at least 3 carbon atoms. There is no upper critical limit for the number of carbon atoms in said hydrocarbon residue, but the upper limit is suitably not higher than 24, preferably not higher than 16 carbon atoms. Examples of hydrophobic groups are a straight or branched, saturated or unsaturated aliphatic group, a phenyl or a mono-, di- or trialkyl-substituted phenyl group, or a group having the formula $R_7O(A)_n$—$(CH_2$—$CH(OH)CH_2)_m$, in which each A, independently of the others, represents an oxyalkylene group derived from ethylene oxide, propylene oxide or butylene oxide, n is a number from 0-4, m is 0 or 1, the sum of n+m being at least 1, and $R_7$ represents a straight or branched, saturated or unsaturated aliphatic group, a phenyl or a mono-, di- or trialkyl-substituted phenyl group, or a cycloaliphatic group.

Illustrative examples of $R_3$, $R_4$, $R_5$ and $R_7$ as aliphatic groups are propyl, butyl, pentyl, hexyl, heptyl, octyl, isoctyl, 2-ethylhexyl, nonyl, isonyl, decyl, isodecyl, dodecyl, myristyl, palmityl, stearyl, oleyl, ricinoleyl, arachidyl and behenyl.

If $R_3$, $R_4$, $R_5$ and $R_7$ represent a cycloaliphatic group, then cyclohexyl, cyclohexylethyl, cyclohexylbutyl, ethylcyclohexyl, butylcyclohexyl, hexylcyclohexyl and octylcyclohexyl are particularly recommended.

If $R_3$, $R_4$, $R_5$ and $R_7$ represent an aromatic group, useful examples are phenyl, methylphenyl, dimethylphenyl, propylphenyl, dipropylphenyl, butylphenyl, dibutylphenyl, octylphenyl, dioctylphenyl, nonylphenyl, dinonylphenyl and docecylphenyl.

Illustrative examples of group A are oxyethylene, 1-oxypropylene, 2-oxypropylene, 2-oxy-2, 3-butylene and 1-oxy-1, 2-butylene.

As extraction reagent a mixture of dithiophosphoric acid and phosphate is preferred in which the groups $R_1$, $R_2$, $R_3$, $R_4$ and $R_5$, independently of each other, represent an aliphatic, cycloaliphatic or aromatic group.

If the dithiophosphoric acid or the phosphate or both have suitable physical properties, the organic liquid may consist only of the phosphate and the dithiophosphoric acid. However, generally, and particularly if the reagent mixture consists mainly of dithiophosphoric acid, it is preferred to dilute the reagent mixture with a diluent, suitably in such proportions that the reagent mixture constitutes 5–80% of the volume of the organic solution. The diluent should be a good solvent for dithiophosphoric acid and should also be difficult to dissolve in water. Examples of useful diluents are an aliphatic or aromatic hydrocarbon of low viscosity at the working temperature, such as a petroleum fraction with a boiling point interval corresponding to that of kerosene and having a high flash-point, which is important from the point of view of safety, or a chlorinated hydrocarbon such as carbon tetrachloride, perchloroethylene.

The extraction and also the washing out of the metal ions from the organic solution can be performed in conventional manner for liquid-liquid extraction processes. An apparatus of the "mixer-settler" type is preferably used, having a mixing chamber in which the two liquids are intimately mixed with the help of a stirrer and a separation chamber in which the two liquids are allowed to separate due to their differing densities. The extraction and the washing is performed at normal temperature, but it is preferred to use an increased temperature, for instance 35°–60° C.

The method and the reagent mixture according to the invention can be used for extraction of several metal ions from aqueous solutions, preferably solutions containing free sulphuric acid or hydrochloric acid, suitably 0.1–1.0 mol per liter. Metal ions worth extracting are primarily ions of chromium, manganese, iron, cobalt, nickel, zinc, cadmium and copper, since these metals often constitute the main proportion of the metal content in waste solutions, such as drainage water from metal mines, leaching solutions obtained from leaching dust, ashes, hydroxide deposit, etc. from plants for pickling metal with acid, from plants for electrolytic coating of metal, or from other surface-treatment plants. The following examples are intended to further illustrate the invention.

Figure 2:
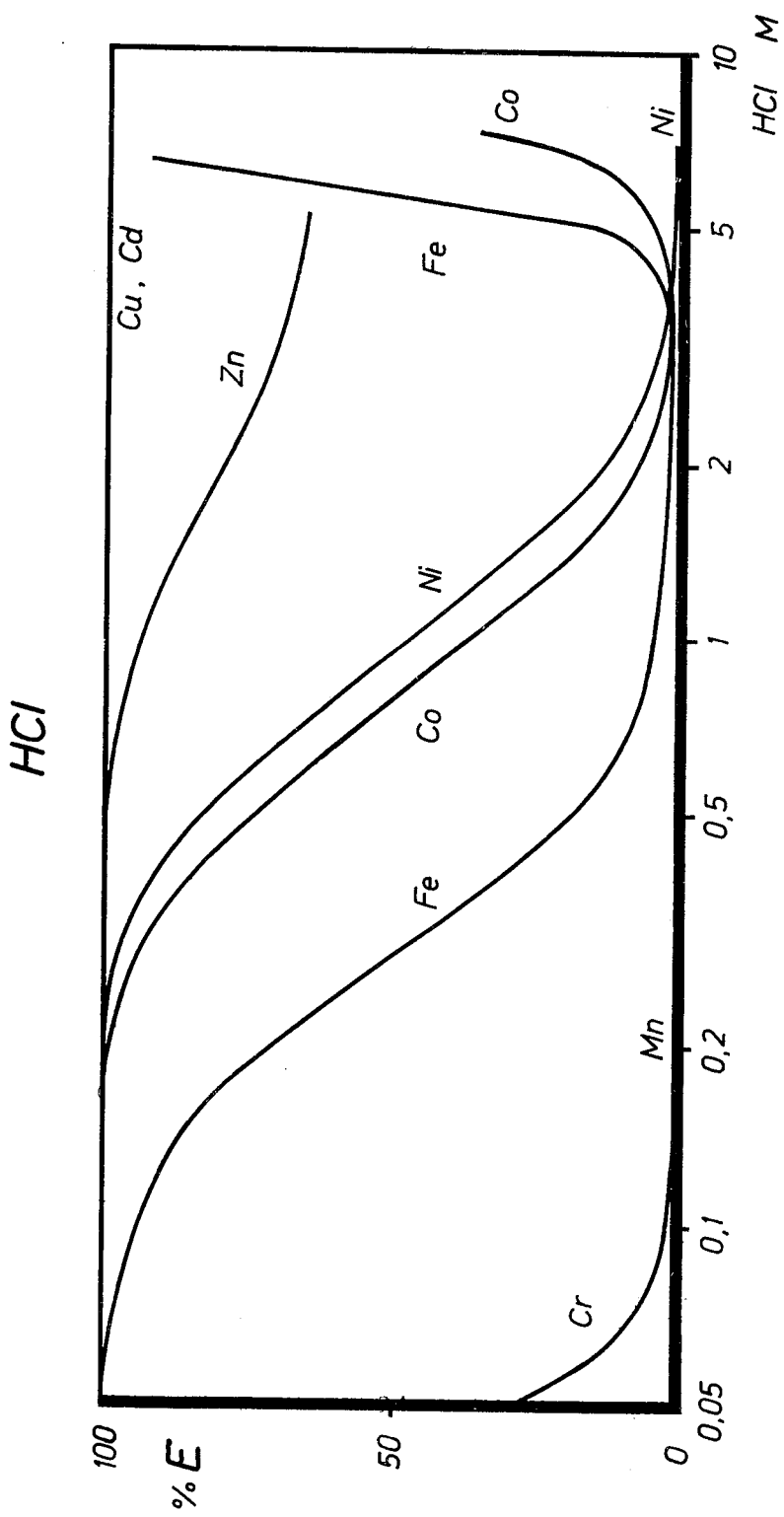

A water solution containing ions of $Cr^{3+}$, $Mn^{2+}$, $Ni^{2+}$, $Fe^{2+}$, $Co^{2+}$, $Zn^{2+}$, $Cd^{2+}$ or $Cu^{2+}$ in a quantity of 0.1 g/l was extracted with a kerosene solution containing 60 percent by volume of a reagent mixture consisting of tributyl phosphate and dioctyldithiophosphoric acid in a ratio of 5:1 by volume. The distribution of the metals between the water phase and the organic phase was determined at varying contents of sulphuric acid and hydrochloric acid. The result obtained can be seen in the diagrams of FIGS. 1 and 2, where the abscissa represents the quantity of free sulphuric acid, or free hydrochloric acid, in the metalliferous water solution, expressed in mol per liter. The ordinate represents the percentage of extracted metal (%E), i.e. the quantity of metal, expressed in percentage, which has been transferred to the organic solution. More specifically % E is defined in the following manner:

$$\% E = \frac{D \cdot \theta \cdot 100}{D \cdot \theta + 1}$$

D is the distribution factor, i.e. the ratio between the concentration of metal ions in the organic solution and in the water solution. $\theta$ is the phase ratio, i.e. the volume ratio between the organic solution and the water solution.

The usefulness of the invention is exemplified by reference to nickel, which is of particular interest since the reagent mixture according to the invention enables the nickel ions to be extracted and, more important, quickly washed out of an acid aqueous solution.

The diagrams show that the entire nickel content is found in the organic solution if the content of free acid in the water solution is at most approximately 0.2 mol/l. It is thus possible to almost completely transfer the nickel ions to the organic solution if the content of free acid in the aqueous solution does not exceed 0.2 mol/l. It can also be seen from the diagrams that only 5% of the nickel content is contained in the organic solution if the content of free acid in the aqueous solution is aproximately 3 mol/l. It is thus possible to substantially completely wash out the nickel ions from the organic solution with a water solution of sulphuric acid or hydrochloric acid containing at least 3 mol free acid per liter. The organic solution washed in this manner can then be used for renewed extraction. Nickel can be recovered from the nickel-containing acid solution in various ways, such as in the form of metal by means of electrolysis, or as nickel sulphate or nickel chloride by means of crystallization.

The diagrams also show that the entire quantity of chromium exists in the water solution whatever the degree of acidity, and that the chromium ions cannot be extracted by the method according to the invention. This means that the invention enables nickel to be effectively separated from chromium by means of a liquid-liquid extraction.

The diagrams also show that bivalent cadmium and copper ions are extracted to the organic solution at all degrees of acidity. These metal ions can easily be removed from acid water solutions by means of the method according to the invention. On the other hand, they cannot be washed out of the organic solution with an acid solution, and other methods must therefore be used, such as direct precipitation of the metal sulphides in the organic solution, followed by filtration. The most efficient method in this case is to blow hydrogen sulphide through the organic solution. Alternatively, the organic solution may be washed with an aqueous solution containing sodium sulphide.

EXAMPLES 1–3

A water solution containing ions of $Fe^{2+}$, $Fe^{3+}$, $Zn^{2+}$, $Ni^{2+}$ or $Cu^{2+}$ was extracted at varying contents of sulphuric acid with a kerosene solution containing 40 percent by volume of a reagent mixture consisting of dicyclohexyldithiophosphoric acid and tributyl phosphate in a ratio of (1) 1:1, (2) 1:5 and (3) 1:10 by volume. From the results shown in the Table, it is clear that all the metal ions tested can easily be extracted with the reagent mixture. The higher the content of dithiophosphoric acid the better. It is also clear that iron ions can be separated from zinc, nickel and copper ions with the reagent mixture.

EXAMPLES 4–6

A water solution containing ions of $Fe^{2+}$, $Fe^{3+}$, $Zn^{2+}$, $Ni^{2+}$ or $Cu^{2+}$ was extracted at varying contents of sulphuric acid with a kerosene solution containing 40 percent by volume of a reagent mixture consisting of (4) di[nonylphenyl-di (oxyethylene)]dithiophosphoric acid and tributyl phosphate, (5) dicyclohexyldithiophosphoric acid and tricyclohexyl phosphate, or (6) di(-nonylphenyl) dithiophosphoric acid and tri(nonylphenyl)phosphate in a ratio of 1:5 by volume for all the reagent mixtures. The results shown in the Table indicate that all the reagent mixtures are well able to extract one or more of the metal ions in question.

EXAMPLES 7–8

A water solution containing ions of $Fe^{2+}$, $Fe^{3+}$, $Zn^{2+}$, $Ni^{2+}$ or $Cu^{2+}$ was extracted at varying contents of sulphuric acid with a kerosene solution containing (7) 60 and (8) 30 percent by volume, respectively, of an extraction mixture consisting of di(ethylhexyl)-dithiophosphoric acid and tributyl phosphate in a ratio of 1:5. The result shown in the Table indicates that the reagent mixture extracts better at high concentration than at low concentration. This is as might be expected.

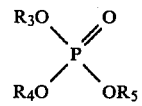

wherein $R_3$ represents a hydrophobic group and $R_4$ and $R_5$, independently of each other, represent hydrogen or a hydrophobic group, $R_3$, $R_4$ and $R_5$ being selected so that the phosphate is insoluble in water, in a ratio by volume between the dithiophosphoric acid and the phosphate of from 1:99 to 9:1, whereupon the metal ions pass to the organic liquid from where said metal ions can be readily re-extracted and stripped therefrom.

2. The method according to claim 1, wherein the hydrophobic groups $R_1$ and $R_2$ contain a hydrocarbon residue of 4–24 carbon atoms.

3. The method according to claim 2, wherein $R_1$ and $R_2$, independently of each other, represent a member selected from the group consisting of a straight or

| Extraction, as percent, at various concentrations of sulphuric acid. | | | | | | | | | | | | | | | |
|---|---|---|---|---|---|---|---|---|---|---|---|---|---|---|---|
| Example | 0.1 M | | | | | 0.3 M | | | | | 1 M | | | | |
| | $Fe^{2+}$ | $Fe^{3+}$ | $Zn^{2+}$ | $Ni^{2+}$ | $Cu^{2+}$ | $Fe^{2+}$ | $Fe^{3+}$ | $Zn^{2+}$ | $Ni^{2+}$ | $Cu^{2+}$ | $Fe^{2+}$ | $Fe^{3+}$ | $Zn^{2+}$ | $Ni^{2+}$ | $Cu^{2+}$ |
| 1 | 90 | 95 | 100 | 100 | 100 | 53 | 60 | 100 | 100 | 100 | 10 | 15 | 96 | 97 | 100 |
| 2 | 75 | 75 | 100 | 100 | 80 | 26 | 26 | 96 | 95 | 97 | 0 | 0 | 72 | 48 | 100 |
| 3 | 0 | 0 | 86 | 88 | 86 | 0 | 0 | 53 | 65 | 95 | 0 | 0 | 18 | 15 | 100 |
| 4 | 0 | 0 | 10 | 8 | 65 | 0 | 0 | 7 | 4 | 70 | 0 | 0 | 0 | 0 | 80 |
| 5 | 65 | 65 | 97 | 80 | 100 | 25 | 25 | 95 | 88 | 100 | 2 | 2 | 75 | 13 | 100 |
| 6 | 0 | 0 | 53 | 82 | 99 | 0 | 0 | 22 | 51 | 98 | 0 | 0 | 5 | 12 | 98 |
| 7 | 65 | 89 | 100 | 100 | 100 | 20 | 40 | 100 | 92 | 100 | 0 | 2 | 78 | 32 | 100 |
| 8 | 28 | — | 95 | — | — | 10 | — | 70 | — | — | 0 | — | 30 | — | — |
| Example | 3 M | | | | |
| | $Fe^{2+}$ | $Fe^{3+}$ | $Zn^{2+}$ | $Ni^{2+}$ | $Cu^{2+}$ |
| 1 | 0 | 0 | 63 | 58 | 100 |
| 2 | 0 | 0 | 30 | 8 | 100 |
| 3 | 0 | 0 | 0 | 0 | 100 |
| 4 | 0 | 0 | 0 | 0 | 100 |
| 5 | 0 | 0 | 30 | 0 | 100 |
| 6 | 0 | 0 | 0 | 0 | 91 |
| 7 | 0 | 0 | 23 | 0 | 100 |
| 8 | 0 | 0 | 12 | — | — |

A dash (—) indicates that no analysis was made.

What is claimed is:

1. A method of extracting metal ions from an aqueous solution by means of liquid-liquid extraction which comprises bringing an aqueous solution containing metal ions into contact with an organic liquid which is insoluble in water and which contains a reagent mixture including a water-insoluble diester of dithiophosphoric acid having the general formula

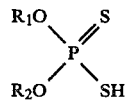

wherein $R_1$ and $R_2$, independently of each other, represent a hydrophobic group, $R_1$ and $R_2$ being selected so that the dithiophosphoric acid is insoluble in water, as well as a water-insoluble phosphate having the general formula branched substituted or unsaturated aliphatic group, a cycloaliphatic group, a phenyl or a mono-, di-, or trialkyl-substituted phenyl group, and a group having the formula $R_6O(A)_n$—$(CH_2CH(OH)CH_2)_m$, wherein each A, independently of the others, represents an oxyalkylene group derived from ethylene oxide, propylene oxide or butylene oxide, n is a number from 0–4, m is 1 or 0, the sum of $n+m$ being at least 1, and $R_6$ represents a member selected from the group consisting of a straight or branched, saturated or unsaturated aliphatic group, a phenyl or a mono-, di- or trialkyl-substituted phenyl group and a cycloaliphatic group.

4. The method according to claim 1, wherein the hydrophobic groups $R_3$, $R_4$ and $R_5$ contain a hydrocarbon residue of 3 to 24 carbon atoms.

5. The method according to claim 4, wherein the hydrophobic groups $R_3$, $R_4$ and $R_5$, independently of each other, represent a member selected from the group consisting of a straight or branched, saturated or unsaturated aliphatic group, or a cycloaliphatic group, a phenyl or a mono-, di- or trialkyl-substituted phenyl group, and a group having the formula $R_7O(A)_n$—$(CH_2CH(OH)CH_2)_m$, wherein each A, independently of the others, represents an oxyalkylene group derived from ethylene oxide, propylene oxide or butylene oxide, n is a number from 0–4, m is 0 or 1, the sum of m+n being at least 1, and $R_6$ represents a member selected from the group consisting of a straight or branched, saturated or unsaturated aliphatic group, a phenyl or a mono-, di- or trialkyl-substituted phenyl group and a cycloaliphatic group.

6. The method according to claim 1, wherein $R_1$ and $R_2$, independently each other represent a member selected from the group consisting of a straight or branched, saturated or unsaturated aliphatic group, a cycloaliphatic group, a phenyl group and a mono-, di- or trialkyl-substituted phenyl group with a total or 4–24 carbon atoms in the relevant groups and $R_3$, $R_4$ and $R_5$ represent independently of each other a member selected from the group consisting of a straight or branched saturated or unsaturated aliphatic group, a cycloaliphatic group, a phenyl group and a mono-, di- or trialkyl-substituted phenyl group with a total of 3–24 carbon atoms in said groups.

7. The method according to claim 1, characterized in that the aqueous solution contains sulphuric acid or hydrochloric acid in a content of 0.1–6.0 mol per liter.

8. The method of claim 1, wherein the ratio by volume of the dithiophosphoric acid and the phosphate is from 1:10 to 2:1.

9. The method of claim 1, wherein the hydrophobic groups $R_1$ and $R_2$ contain a hydrocarbon residue of 6–16 carbon atoms.

10. The method of claim 1, wherein $R_1$ and $R_2$, independently of each other, represent a member selected from the group consisting of a straight or branched, saturated or unsaturated aliphatic group, a cycloaliphatic group, a phenyl group and a mono-, di- or trialkyl-substituted phenyl group with a total of 6–16 carbon atoms in the relevant groups.

11. The method of claim 1, wherein the aqueous solution contains at least one ion selected from the group consisting of iron, zinc, copper, nickel, cadmium, chromium, manganese and cobalt.

* * * * *